Nov. 30, 1943. J. A. RONNING 2,335,541
HIGH GRASS LAWNMOWER
Filed Nov. 4, 1940 4 Sheets-Sheet 1
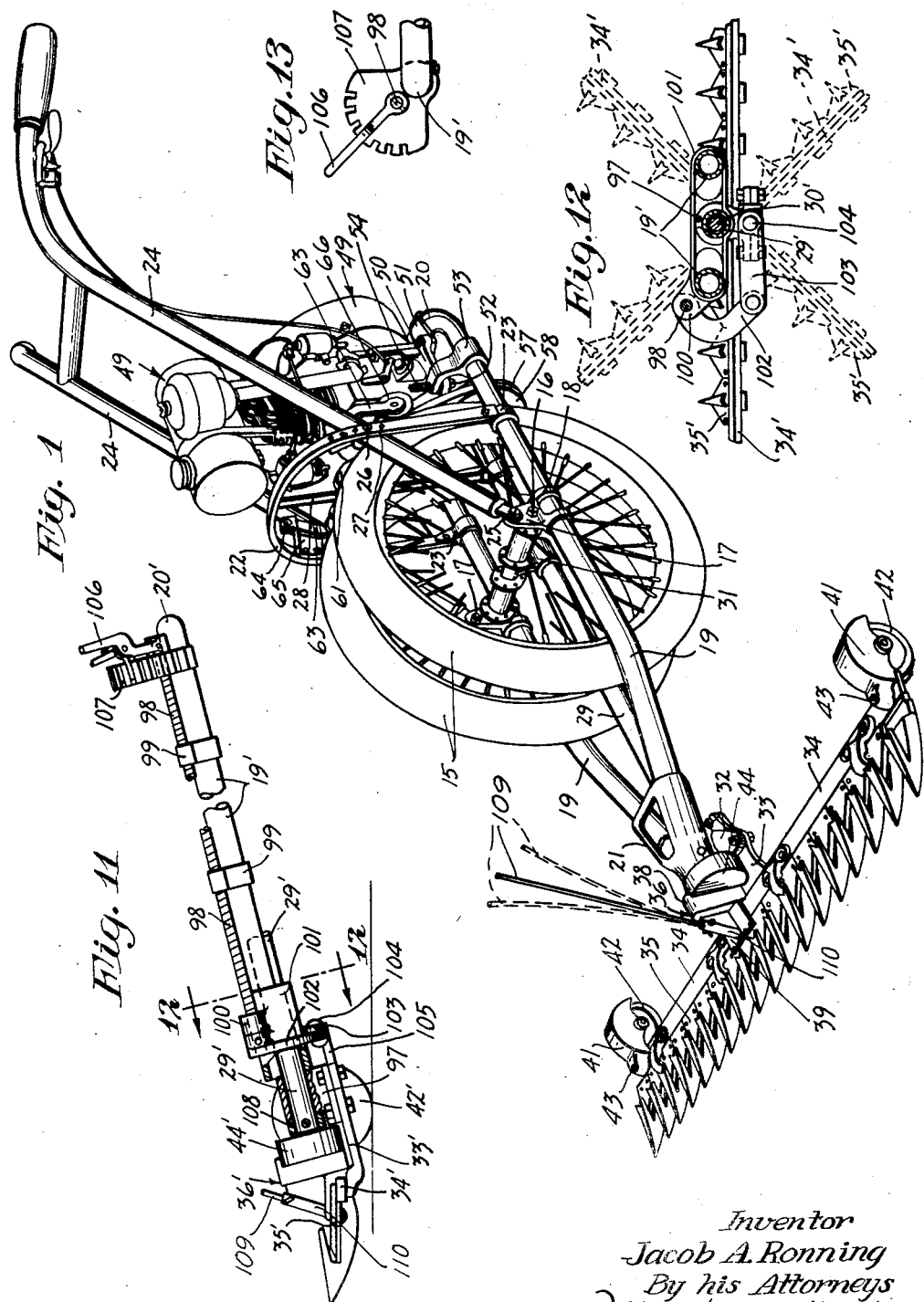
Inventor
Jacob A. Ronning
By his Attorneys

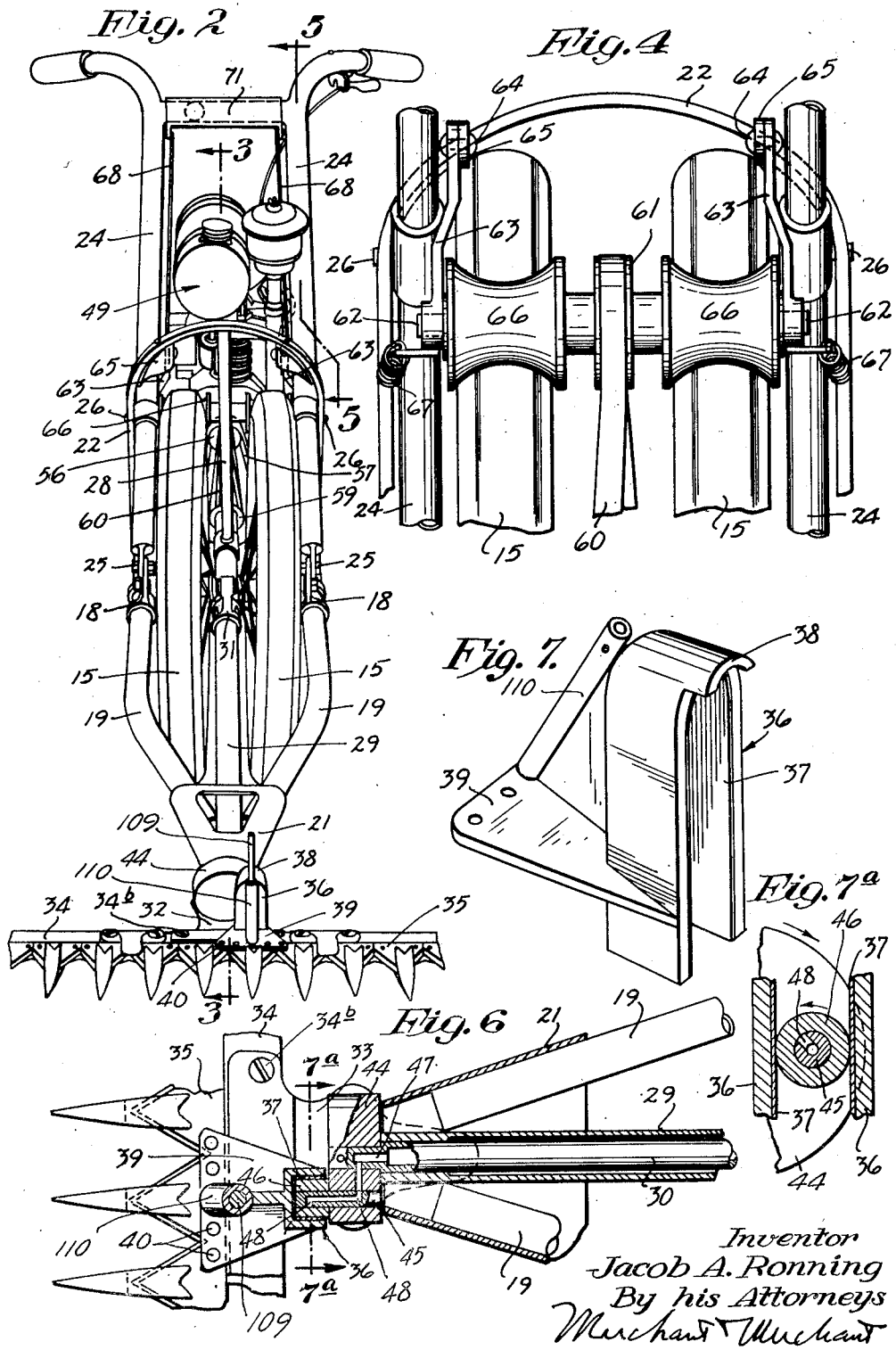

Nov. 30, 1943.  J. A. RONNING  2,335,541
HIGH GRASS LAWNMOWER
Filed Nov. 4, 1940  4 Sheets-Sheet 3
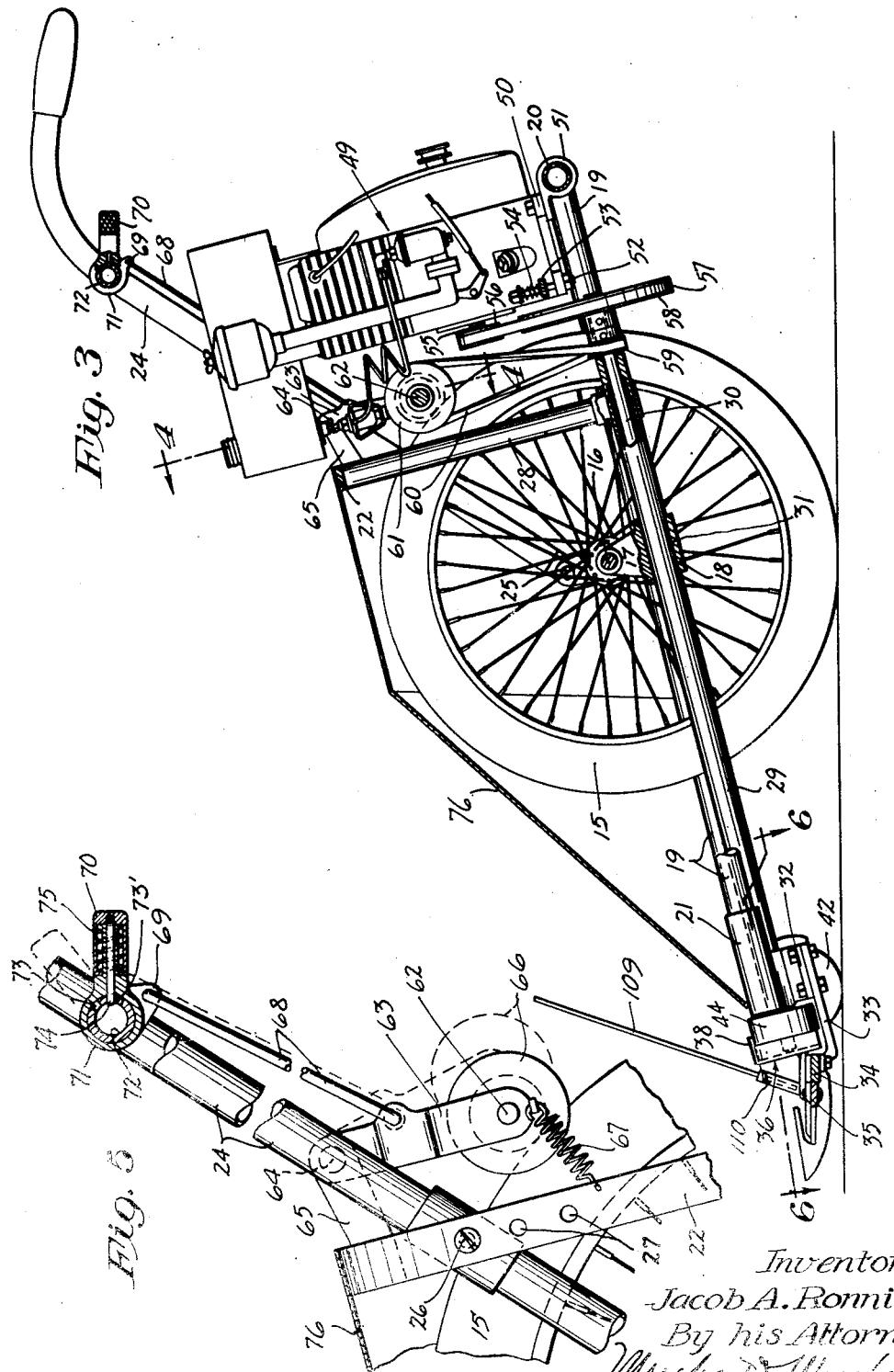
Inventor
Jacob A. Ronning
By his Attorneys

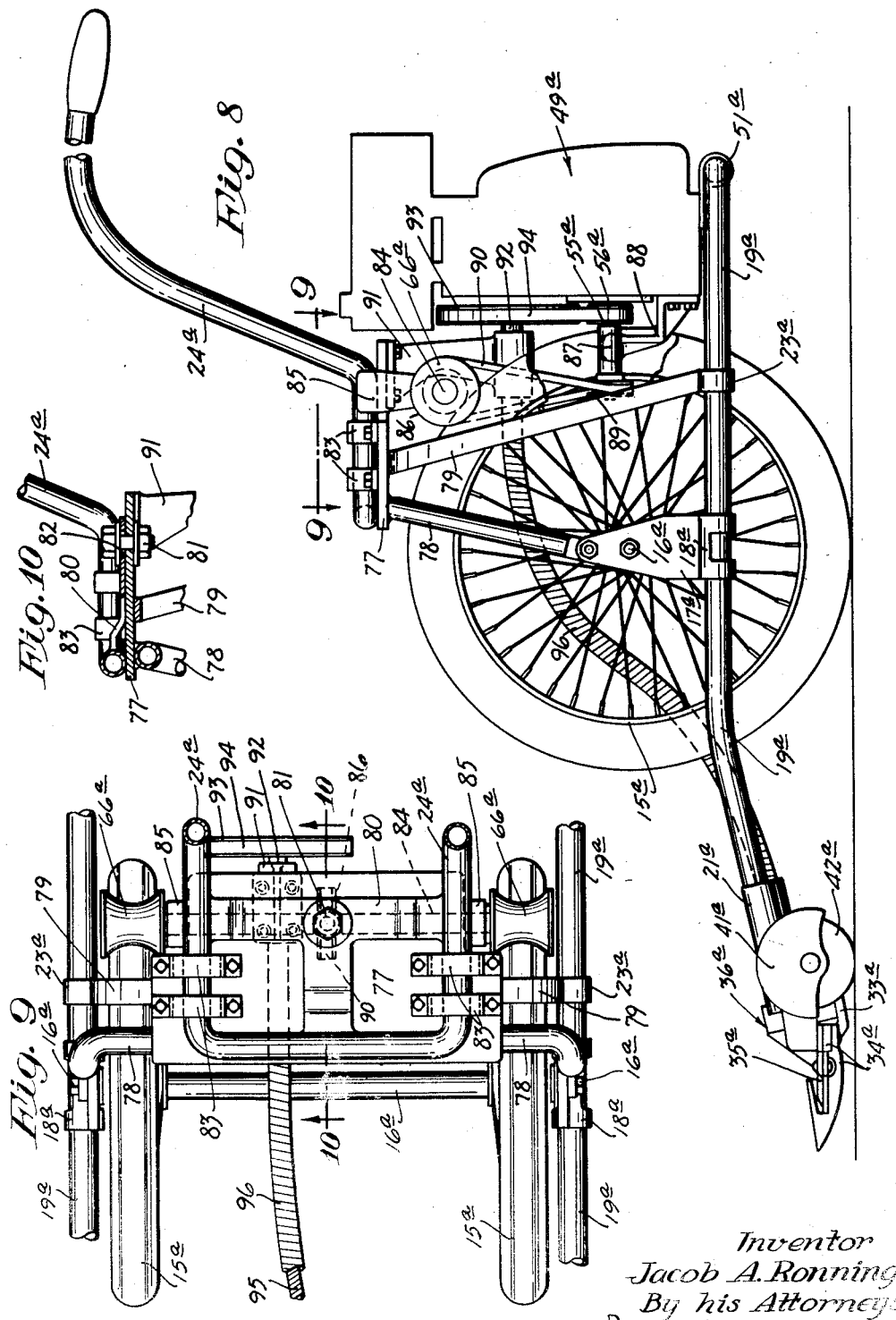

Patented Nov. 30, 1943

2,335,541

UNITED STATES PATENT OFFICE 2,335,541

HIGH GRASS LAWN MOWER

Jacob A. Ronning, Minneapolis, Minn.

Application November 4, 1940, Serial No. 364,217

32 Claims. (Cl. 56—26.5)

My present invention relates to mowers or long grass cutters of the type adapted to be pushed forward by a person walking and operating the same. Especially the improved mower is adapted for use in cutting the long grass on golf links and certain fields where the use of large and heavy mowers is not feasible. In a general way this improved mower is in the nature of an improvement on or modification of the mower disclosed and claimed in my application S. N. 288,358, filed August 4, 1939, now Patent No. 2,251,637, granted May 8, 1941, and entitled "High grass lawnmower."

Generally stated, the object of the invention is to provide a mower of the above class that may be manufactured at reasonably low cost, that will be highly efficient in use and that may be easily manipulated. Generally stated, the invention consists of the novel devices, combinations of devices and arrangement of parts hereinafter described and defined in the claims.

In the improved mower the power for operating the grass cutting mechanism is a small gas engine. The mower is adapted to be readily pushed forward by hand power, but novel means is provided for rendering the motor also operative to propel the traction wheels, under manual control and at will. Two traction wheels are employed and these are placed closely together so as to facilitate turning or steering of the machine; and frictional driving mechanism is operative on the periphery of the wheels. The wheels are assumed to be and should be equipped with pneumatic tires, directly against which the frictional driving wheels or devices operate.

The framework is arranged to embrace or surround the traction wheels; the motor is mounted on the rear portion of the frame and has a centrally located driving shaft extended between the traction wheels and below the axes thereof so that the machine is given a low center of gravity.

The cutting device involves a tooth-equipped finger bar and a blade-equipped bar or sickle. The finger bar is intermediately connected to the front end of the frame. At its intermediate or central portion the sickle bar is provided with a vertically grooved or slotted thrust head that is engaged by a crank carried at the front end of the centrally located motor-driven main or driving shaft.

The above and other important features will appear in the description of the drawings which illustrate a preferred and modified form of the invention.

Referring to the drawings:

Fig. 1 is a view in perspective showing what I believe to be a preferred embodiment of the invention;

Fig. 2 is a plan view of the improved machine illustrated in Fig. 1, some parts being broken away;

Fig. 3 is a vertical front to rear section taken approximately on the line 3—3 of Fig. 2;

Fig. 4 is a vertical transverse section taken approximately on the line 4—4 of Fig. 3, some parts being broken away;

Fig. 5 is a fragmentary section taken approximately on the line 5—5 of Fig. 2, some parts being removed;

Fig. 6 is a fragmentary view partly in plan and partly in horizontal section on the line 6—6 of Fig. 3;

Fig. 7 is a view in perspective showing the crank-operated thrust head removed from the sickle bar;

Fig. 7a is a fragmentary section taken on the line 7a—7a of Fig. 6;

Fig. 8 is a view corresponding to Fig. 1 but illustrating a somewhat modified structure;

Fig. 9 is a view chiefly in plan with parts broken away but partly in section on the line 9—9 of Fig. 8;

Fig. 10 is a fragmentary section taken on the line 10—10 of Fig. 9;

Fig. 11 is a view chiefly in side elevation but with some parts broken away and some parts sectioned, illustrating a modified structure wherein the finger bar and sickle bar are adapted to be tilted transversely to adapt the machine for more readily cutting inclined surfaces;

Fig. 12 is a section taken on the line 12—12 of Fig. 11 certain of the adjustments of the finger bar and sickle being indicated by dotted lines; and Fig. 13 is an end elevation looking at the mechanism of Fig. 11 from the right toward the left.

The machine illustrated in Figs. 1 to 7 inclusive will first be described. In this improved machine the frame and parts carried thereby are mounted on two closely spaced axially aligned wheels 15. These wheels are preferably of the pneumatic tire-equipped bicycle type for the sake of lightness, but may take other forms. The axially aligned hubs of these wheels are closely but laterally spaced on a transverse shaft 16, the ends of which are rigidly secured to upstanding lugs or flanges 17 of bearing sleeves 18 that are rigidly applied on the side bars 19 of the frame structure. The bars 19 are preferably metal pipe sections which, at their ends and at the rear of the wheels, are rigidly connected by a cross yoke 20 that may be formed as an integral part of the said frame tubes. At their converging front ends the side bars 19 are extended into and welded or otherwise rigidly secured to a converging coupling head 21 which, as shown, and preferably, is a sheet metal structure, but might take various other forms, see particularly Figs. 1 and 6. It should be here noted that the side bars 19 are in a plane that is considerably below the axis of the wheels 15, as best shown in Fig. 3, so as to bring the center of gravity of the machine as low as practicable. The side bars 19 at the rear of the wheels are tied together by a strong inverted U-shaped yoke 22, which at its lower ends is anchored to collars 23 rigid on the side bars 19.

Upwardly and rearwardly extended handle bars 24 preferably of hollow metal pipes at their lower front ends are anchored to the upstanding lugs 17 at 25; and these handle bars 24 are rigidly connected at 26 to the sides of said yoke. These handle bars may be made vertically adjustable by providing the yoke 22 with spaced bolt holes 27, or the like, as best shown in Fig. 5.

For an important purpose, hanger rod or pipe section 28 is rigidly secured at its upper end to the top of the yoke 22, and at its lower end is rigidly secured to a metallic tube or pipe section 29 that affords a casing for a main driving shaft 30. This shaft casing 29 is in the plane not only below the axis of the wheels but below the plane of the side bars 19, and at its intermediate portion is extended through and rigidly secured to a hanger bracket 31, the upstanding flange of which is hung on the fixed wheel shaft or axle 16 just between the hubs of the two wheels, see Figs. 1 and 3. This tubular casing 29 and shaft 30 are located centrally between the two wheels and between the two side bars 19. The casing 29, see particularly Fig. 6, is at its front end extended centrally through the coupling head 21 and is welded or otherwise rigidly secured thereto.

As best shown in Figs. 1, 3 and 6, the coupling head 21 has outstanding flanges 32 which, by nut-equipped bolts, or otherwise, are rigidly secured to an extended coupling plate 33. This coupling plate 33 in turn is pivoted, riveted, or otherwise rigidly secured to the intermediate portion of the finger-equipped bar 34 of the cutting mechanism. Preferably this finger bar is made detachable from the coupling plate 33 by screws or bolts 34b, see particularly Fig. 6. The cutting mechanism here illustrated is of a well known reciprocating type wherein the blade-equipped sickle bar is mounted for reciprocating movements in the finger bar. This blade-equipped sickle bar is indicated as an entirety by the numeral 35.

In Fig. 7 I have shown in detail a cross head 36 which is a substantially inverted U-shaped structure which has parallel sides, open bottom, closed front and open rear and is preferably but not necessarily lined with a hardened metal insert or facing 37. The top of this cross head is closed by a crown 38 that projects beyond the open face of the structure for a purpose that will hereinafter appear. The cross head 36 is preferably a casing formed integral with an anchoring flange 39 that rests upon the sickle bar and is rigidly secured thereto by rivets 40 or the like.

The outer ends of the finger bar 34 are supported by caster-acting wheels which limit the distance of the cutting mechanism from the ground. These caster devices, as shown, involve caster brackets 41 and wheels 42. The brackets 41 are pivotally connected to the ends of the finger bar at 43, as best shown in Fig. 1.

At its front end the driving shaft 30 is provided with a crank head 44, see particularly Fig. 6, that has an offset crank pin 45 equipped at its outer end with a roller 46, that works upwardly and downwardly in the cross head 36. The driving shaft 30 is preferably tubular so that it will serve as a conductor for oil or fluid lubricant. The wrist pin 45 is rigid in the crank head 44 and, hence, does not turn therein but the roller 46 simply rotates on said wrist pin. To conduct lubricating material from the axial oil passage 47 to the interior of the roller 46, a small oil duct 48 is extended through said coupling head and wrist pin. Oil thus conducted will also lubricate the exterior of the roller 46 and the engaged parallel walls of the cross head. Inasmuch as the inner wall of the cross head is closed, the roller cannot move axially off from the wrist pin and no other means for preventing axial movements of said roller is required.

By reference to Fig. 5 it will be noted that with the arrangement shown, when the finger bar and sickle bar are in horizontal position as when cutting, the cross head will stand in an oblique plane that is perpendicular to the axis of the driving shaft 30, thereby causing the roller-equipped wrist pin to travel properly in the cross head. Otherwise stated, the open face of the cross head is parallel to the oblique plane of the front face of the crank head 44 and stands close to the latter.

The motor for operating the cutting mechanism and at will for imparting travelling movements to the traction wheels is preferably a small internal combustion engine. This engine, which is or may be of a well known type, is indicated as an entirety by the numeral 49 and is mounted directly upon the rear portion of the framework. As shown, the engine block, which makes up the cylinder and crank case, is provided with a base flange 50 that is pivoted to projecting lugs or collars 51 mounted on the transverse rear portion 20 of the framework. To yieldingly support the engine from the framework, a nut-equipped and headed bolt 52 is passed through the front portion of the flange 50 and through a bracket 53 that is rigidly secured on the adjacent side bar 19, see particularly Figs. 1 and 3. A coiled spring 54 is placed on the bolt 52 and compressed between the head of said bolt and the bracket 53.

Of the running parts of the engine, it is only desirable for the purpose of this case to particularly note the crank shaft 55 that is equipped with a pulley 56. A belt 57 runs over the pulley 56 and over a larger pulley 58 on the extreme rear end of the main shaft 30. Here it may be noted that the spring 54 serves to keep the belt 57 tight on the pulleys 56 and 58. Shaft 30, forward of pulley 58, is provided with a small pulley 59.

A belt 60 runs over the pulley 59 and over a larger pulley 61, see particularly Figs. 3 and 4. Pulley 61 is journalled on the intermediate portion of a floating shaft 62, the ends of which are rigidly secured to the free ends of arms 63 that are pivoted at 64 to brackets or lugs 65 rigidly secured on the upper portion of the yoke 22, as best shown in Figs. 4 and 5. The hub of the pulley 61 is secured to laterally spaced friction rollers 66 which, like said pulley, are journalled on the shaft 62 between the arms 63. These friction rollers 66 are designed to frictionally engage the pneumatic tires of the wheels and, hence, are made concave. Coiled springs 67 are attached to the free ends of the arms 63 and are anchored to the sides of the yoke 22 and exert force that will hold the rollers 66 in frictional driving action against the tires of the wheels, when said springs are released for action.

Means is provided, however, for holding said rollers 66 out of contact with the wheel tires when the engine is not to be used for propelling the achine. As a means for accomplishing this result, the arms 63 are connected by links or rods 68 to offset lugs 69 of a handle member 70, the sleeve-like hub 71 of which is pivoted on a cross bar 72 that rigidly connects the outer or rear portions of the handle bars 24. Said cross bar 72, as shown, is tubular and provided with a lock notch or perforation 73, see particularly Fig. 5, but also note Fig. 2. Mounted in the handle 70 is a retractable lock pin 74 which, when engaged with the notch 73, will lock the arms 63 and rollers 66 in the inoperative positions shown in Fig. 5. However, when lock pin 74 is retracted, spring 67 will frictionally engage the rollers 66 with the wheel tires.

Any suitable means may be provided for retracting the lock pin 74, but, as shown, a cap-like head is applied to the outer end of lock pin 74 and is subject to a coiled spring 75 which tends to project the lock pin toward the axis of the hub 71.

In Figs. 3 and 5 the numeral 76 indicates a shield or cover supported by the yoke 22 and head 21, the said shield in the other views being removed or not shown.

The structure illustrated in Figs. 8, 9 and 10 is, in many respects, very similar to or identical with the structure already described, and those parts that are substantially identical are indicated by the numerals hitherto used with the added exponent a. In this modified structure the wheels 15a are independently journalled on axle shaft 16a secured at its ends to the upstanding flanges 17a of collars 18a rigidly secured on the side bars 19a. The handle bars 24a are mounted on a raised table or deck 77 rigidly supported above the walls 78 by legs 78 and 79, the former of which are rigidly bolted to the flanges 17a and the latter of which are rigidly secured to the side bars 19a. The handle bars 24a are shown as integral or formed from a single piece of metal pipe or tubing and are mounted for sliding and oscillatory movements on said table 77 for an important purpose which will now appear. In providing this mounting a T-shaped tie plate 80 is formed integral with or rigidly secured to the front portions of the handle bars and is connected to the table 77 by a nut-equipped bolt 81 that works through an enlarged bolt hole 82 in said table. This bolt hole 82 is large enough to permit forward and rearward sliding movements of the handle bars and tie plate 80 and, of course, will permit oscillatory movements of the handle bars in respect to the table. Elongated retaining straps 83 are bolted or otherwise secured on the table but will permit lateral movements of the handle bars on the pivot 81. The importance of this will presently appear.

In this modified structure the friction rollers 66a are secured on the ends of a shaft 84 that is journalled in bearing lugs 85 that are secured to and depend from the tie plate 80 and, hence, partake of the oscillatory and forward and rearward movements of said tie plate 80 and of the handle bars 24a. Secured on the intermediate portion of shaft 84 is a pulley 86. In this modified structure the engine-driven pulley 56a, which is on the crank shaft 55a, is carried also by a shaft 87 mounted in a bracket 88 secured to the engine block. Shaft 87 also carries a pulley 89, see Fig. 8, over which and the pulley 86 of shaft 84 runs a belt 90.

Rigidly secured to and depending from the rear portion of table 77 is a bearing bracket 91 in which is journalled a shaft 92 that carries a relatively large pulley 93 over which and the engine-driven pulley 56a runs a belt 94.

Also in this modified structure the power to operate the cutter from the shaft 92 is a flexible shaft 95, the front end of which will be connected to and arranged to rotate the crank-equipped head which would correspond to the heretofore described crank head 44. The flexible shaft 95 is shown as within a flexible metallic casing 96.

In the structures above described, the finger bar and sickle bar are arranged to work in a plane parallel to the ground contacting portions of the traction wheels; but in Figs. 11, 12 and 13 I have illustrated an arrangement whereby the said cutting mechanism can be set to work on inclines or planes oblique to the ground-engaging surfaces of the traction wheels. Such an arrangement has the advantage of setting the cutting mechanism to cut on the steep incline without tilting the machine to a corresponding extent. This structure, as illustrated, is as follows:

Certain of the parts here illustrated correspond to certain parts already described and those parts that do correspond to previously described elements are marked with the same numerals with prime marks added. In this modified structure the plate 33', which corresponds closely to the plate 33 earlier described, instead of being rigidly secured to the front end of frame tube 29, is swivelled on the corresponding tube 29' by means of a bearing 97 so that the cutting mechanism is capable of angular movements transversely of the machine, as above indicated. To control these angular adjustments a flexible shaft 98 is mounted in bearings 99 and 100 respectively on the side frame 19' and on a yoke 101 that embraces the bars 19' and is secured thereto and to the tube 29' and, hence, acts as a base of reaction in the rocking of the cutting mechanism. To the extreme front end of flexible shaft 98 is secured the upper end of a link 102, the lower end of which is connected to a second link 103 that is pivoted at 104 to a lug 105 that projects from the plate 33' at a point below the axis of tube 29'.

By oscillation of the shaft 98 the cutting mechanism can be moved from normal or horizontal position indicated by full lines into inclined or oblique positions indicated by dotted lines.

To lock the cutting mechanism in its different adjustments, shaft 98, at its upper end, has a projecting arm 106, see Figs. 11 and 13, that is adapted to be locked to a notched segment 107 rigidly secured on the upper portion of the frame 19'. In Fig. 11 the numeral 108 indicates a collar secured on the extreme front end of tube 29' to hold bearing 97 against axial movements.

In the use of the machine above described and illustrated, for example in Fig. 1, without an additional feature which will presently be described, I have found that there is a tendency for the cut grass to accumulate and pile up on the framework in front of the wheels. This piling up action on the framework I have in practice eliminated by the use of a very simple and highly efficient device which consists in applying a resilient rod-like divider 109 to the reciprocating sickle bar. Preferably this resilient rod or divider 109, at its lower end, is directly secured in a socket 110 formed as a part of the crosshead 36, which latter is, of course, directly secured to the sickle bar for vibration therewith. This rod or divider 109 is upwardly extended with a rearward inclination. Under vibration of the sickle bar, this rod or divider 109 will vibrate back and forth as indicated by dotted lines in Fig. 1. The main function of this divider rod is to separate or spread the accumulating cut grass, vines, or the like, and to throw or deflect the same first in the one direction and then in the other and thereby prevent the accumulation of the cut grass on the framework and against the wheels. In actual practice I have found that this vibratory rod acts so effectually that it will divide the cut grass into two swaths on opposite sides of the machine proper. Of course, the rearwardly extended deflector will have a certain dividing action even when not in motion, but when in motion, it is found highly effective for the purposes above stated.

In the actual use of this vibratory resilient divider I have found that it performed another highly important function in that it reduces the vibration in the cutting mechanism. This result seems to be accomplished by the vibrations in the rod which offset in some way the vibrations in the sickle bar. Of course, when the sickle bar is initially moved in one direction, the resilient rod will not immediately exert any perceptible inertia against such movement. At any rate, the inertia of the rod is never added to that of the sickle bar, but, on the other hand, offsets the same to a perceptible extent.

Preferably the vibratory divider rod or bar is a round rod which could be also flexible in a front to rear direction in respect to the travel of the machine and, hence, will yield if the machine be forced under an obstruction. However, in actual practice, except for this rearward yielding action, I have found that a flat resilient steel bar set edgewise in respect to the travel of the machine will be fully as efficient and probably more efficient than the round rod. The lateral resilience of the rod, however, is of the utmost importance.

In a machine of the kind described, of course, high efficiency in the cutting action is required, and this object is accomplished with the driving mechanism described. In a machine that is to be manipulated or manually controlled in its operation lightness in the structure is a highly important factor, and this is accomplished by a trussed frame structure that has great strength. The steering of the machine is made easy by manipulation of the handle bars. The frame members are extended below the axles and hubs of the wheels so as to bring the center of gravity of the machine as low as practicable. The wheels are spaced closely together so that the difference in rotation thereof in turning around will be at a minimum which makes steering an easy matter. The power means for imparting travelling movement to the traction wheels is available at any time for advancing the machine independently of any forward push thereon produced through the handle bars.

The main elements of the framework are the rigidly connected side bars extended at the outer side of the wheels and the tubular transmission shaft casing that is extended between the wheels. These frame elements are rigidly connected at their front ends and are securely attached to the intermediate portion of the finger bar of the cutting mechanism.

The above and other accomplished features have produced a highly efficient high grass cutter especially adapted for the purposes indicated or for analogous uses.

With the arrangement illustrated in Figs. 8, 9 and 10, the control of the application of power to the traction wheels is accomplished as follows. When the handle bars 24a are pushed forward and caused to slide slightly forward on the table 77, both of the power driven rollers 66a will operate on the cooperating traction wheels. If when thus pushed forward the handle bars are pressed toward the left, then only the left-hand traction wheel will be driven, or if the handle bars should be pressed toward the right, then only the right-hand traction wheel will be driven. In this way power will be applied to produce or greatly assist in causing the machine to turn toward the left or right. If these power driving actions are not desired, then the handle bars may be pulled rearward, and the nut-equipped bolt 81 tightened.

The modified structure illustrated in Figs. 11, 12 and 13 can be utilized in either of the machines described or in similar machines.

Several embodiments of the invention have been illustrated and described, but it will, of course, be understood that various other modifications or arrangement of parts may be made within the scope of the invention herein disclosed and claimed.

What I claim is:

1. In a machine of the kind described, a pair of closely spaced wheels, a frame including laterally spaced side bars between which said wheels are located and to which said wheels are journalled, a coupling head rigidly connecting the front ends of said side bars, a tubular shaft casing located between said wheels with its front end rigidly connected to said coupling head and its rear portion supported from said side bars, a main drive shaft journalled in and extended through said centrally located casing, an engine mounted on the rear portion of said framework and connected to the rear end of said main shaft, the latter at its front end, forward of said coupling head, having a crank head, a finger-equipped bar intermediately connected to said coupling head, and a sickle bar cooperatively mounted on said finger bar and provided at its intermediate portion with a vertically extended cross head subject to said crank head.

2. The structure defined in claim 1 in further combination with an inverted yoke supported from said side bars and having a depending centrally located hanger rod rigidly connected at its lower end to the rear portion of said centrally located casing and directly supporting the same.

3. The structure defined in claim 1 in which said side bars and centrally located tubular casing are extended materially below the axis of said wheels.

4. The structure defined in claim 1 in which said centrally located casing and the drive shaft therein extend obliquely downward in respect to the cutting plane of said finger bar and sickle bar and the working face of said cross head is at right angle to the axis of said main driving shaft.

5. The structure defined in claim 1 in which said wheels are independently journalled on an axle that is mounted in bearings secured to and upstanding from the intermediate portions of said side bars.

6. The structure defined in claim 1 in which said centrally located casing and the drive shaft therein extend obliquely downward in respect to the cutting plane of said finger bar and sickle bar and the working face of said cross head is at right angle to the axis of said main driving shaft, said cross head having a crank-engaging channel open at its bottom and rear face but closed at its top and front face.

7. The structure defined in claim 1 in which said centrally located casing and the drive shaft therein extend obliquely downward in respect to the cutting plane of said finger bar and sickle bar and the working face of said cross head is at right angle to the axis of said main driving shaft, said cross head having a crank-engaging channel open at its bottom and rear face but closed at its top and front face, the top of said cross head having a projecting flange that overlies a portion of said crank head.

8. In a machine of the kind described. a pair of closely spaced wheels, a frame including laterally spaced side bars between which said wheels are located and to which said wheels are journalled, a coupling head rigidly connecting the front ends of said side bars, a tubular shaft casing located between said wheels with its front end rigidly connected to said coupling head and its rear portion supported from said side bars, a main drive shaft journalled in and extended through said centrally located casing, an engine mounted on the rear portion of said framework and connected to the rear end of said main shaft, the latter at its front end, forward of said coupling head, having a crank head, a finger-equipped bar intermediately connected to said coupling head, and a sickle bar cooperatively mounted on said finger bar and provided at its intermediate portion with a vertically extended cross head subject to said crank head, an inverted yoke connecting said side bars, handle bars connected to the intermediate portions of said side bars and to the sides of said yoke and extended rearward therefrom.

9. The structure defined in claim 1 in combination with means for rendering said engine operative to frictionally drive said wheels.

10. The structure defined in claim 1 in combination with means for rendering said engine operative to frictionally drive said wheels, said last noted means including engine-driven rollers frictionally engageable with said wheels and means for rendering said rollers operative and inoperative at will.

11. The structure defined in claim 8 in which said yoke has a centrally located depending hanger rod rigidly connected at its lower end to the rear portion of said centrally located shaft casing.

12. The structure defined in claim 1 in which said wheels are mounted for independent rotation and in further combination with engine-driven rollers frictionally active on the peripheries of said wheels.

13. The structure defined in claim 1 in which said wheels are mounted for independent rotation and in further combination with engine-driven rollers frictionally active on the peripheries of said wheels, and manually operated means for moving said frictional rollers into and out of action.

14. The structure defined in claim 1 in further combination with an inverted yoke supported from said side bars and having a depending centrally located hanger rod rigidly connected at its lower end to the rear portion of said centrally located casing and directly supporting the same, laterally spaced arms pivotally hung from said yoke, frictionally-acting engine-driven rollers mounted on said arms and in position for engagement with the peripheries of said wheels, yielding means tending to press said rollers against said wheels, and means for retracting and locking said rollers in inoperative positions.

15. The structure defined in claim 1 in which said finger bar is mounted for angular oscillatory movements in respect to said coupling head, and means for locking said finger bar in different angular adjustments.

16. The structure defined in claim 8 in which said finger bar is mounted for angular oscillatory movements in respect to said coupling head, and means for locking said finger bar in different angular adjustments.

17. The structure defined in claim 1 in which the crank head on the front end of said main drive shaft has a projecting roller-equipped wrist pin, the latter working in the vertical runway of said cross head, said main drive shaft, crank head and its wrist pin having an oil duct leading therethrough to the interior of the roller of said wrist pin.

18. The structure defined in claim 1 in further combination with handle bars mounted for limited forward and rearward and oscillatory movements on said machine, and a pair of engine-driven rollers movable with said handle bars into and out of engagement with the respective traction wheels under forward and rearward and oscillatory movements of said handle bars.

19. The structure defined in claim 1 in further combination with a raised deck rigidly connected to the framework of the machine, rearwardly extended handle bars, a tie plate rigidly connected to said handle bars and mounted on said deck for limited forward and rearward and oscillatory movements, an engine-driven shaft journalled to said tie plate, and driving rollers on the ends of said last noted shaft operative simultaneously or independently on the traction wheels, under control of said handle bars.

20. The structure defined in claim 1 in which said engine is spaced rearward of the rear end of said main drive shaft and its casing and said drive shaft is driven through transmission mechanism including pulleys on said main shaft and on the engine crank shaft, and a belt running over said pulleys.

21. In a machine of the kind described, the combination with a cutting mechanism including a toothed finger bar and a cooperating vibratory sickle bar, of a resilient divider rod which, at its lower end, is operatively associated with said sickle bar, and at its upper end is free for lateral vibrations that differ from but are the result of the movements of the sickle bar.

22. In a machine of the kind described, a framework provided at its forwardly projecting end with a rotary crank, a toothed finger bar intermediately secured to the front end of said frame, a sickle bar cooperating with said finger bar, a crosshead secured to the intermediate portion of said sickle bar and operatively associated with said crank, and a resilient divider bar which, at its lower end, is directly anchored to said crosshead and hence indirectly anchored to said sickle bar and is free for lateral vibrations at its upper end.

23. In a machine of the kind described, the combination with a supporting frame structure, a vibratory cutting mechanism comprising a finger bar and a co-operating sickle bar, one of said bars being mounted in fixed relation to the supporting frame and the other thereof being mounted for vibratory movements with respect to its co-operating bar, a cross-sectionally channel shaped cross-head mounted on the vibratory bar of the cutting mechanism, the channel of said cross-head being substantially vertically disposed and being closed at its front, sides, and top and being rearwardly and downwardly open, and a power-driven crank pin working in the cross-head channel.

24. The structure defined in claim 23 in further combination with a drive shaft extended forwardly and rearwardly of the supporting frame, a cylindrical crank-head concentrically mounted on the front end of the crank-shaft and on the front end of which the said crank pin is mounted in eccentric relation to the axis of said head, said crank-head working in closely spaced relation to the rear end of the cross-head and largely closing the rearwardly opening channel thereof.

25. The structure defined in claim 23 in further combination with a drive shaft extended forwardly and rearwardly of the supporting frame, a cylindrical crank-head concentrically mounted on the front end of the crank-shaft and on the front end of which the said crank pin is mounted in eccentric relation to the axis of said head, said crank-head working in closely spaced relation to the rear end of the cross-head and largely closing the rearwardly opening channel thereof, the closed top of the cross-head channel being slightly above the plane of the crank-head and having a rearwardly projecting portion that overlies the crank-head and prevents downward entry of foreign substance into the channel.

26. In a machine of the kind described, the combination with a supporting frame structure, a vibratory cutting mechanism comprising a finger bar and a co-operating sickle bar, one of said bars being mounted in fixed relation to the supporting frame and the other thereof being mounted for vibratory movements with respect to its co-operating bar, a cross-sectionally channel shaped cross-head mounted on the vibratory bar of the cutting mechanism, the channel of said cross-head being substantially vertically disposed and being closed at its front, sides, and top and being rearwardly open, and a power-driven crank pin working in the cross-head channel, a drive shaft extended forwardly and rearwardly of the supporting frame, a crank mounted on the front end of the shaft and on the front end of which head said crank pin is mounted in eccentric relation to the axis of said head, said crank-head working in closely spaced relation to the rear end portion of the cross-head and largely closing the open rear end of said channel, the closed top of the cross-head channel having a rearwardly projecting portion that overlies the crank-head and prevents downward entry of foreign substance into the channel.

27. In a machine of the kind described, a pair of closely spaced wheels, a frame including laterally spaced side bars adjacent to which the wheels are located and to which the wheels are journaled, a coupling head rigidly connecting the front ends of said side bars, a tubular shaft casing located between said wheels with its front end rigidly connected to said coupling head and its rear portion supported from said side bars, a main drive shaft journaled in and extended through said centrally located casing, an engine mounted on the rear portion of said frame work and connected to the rear end of said main shaft, the latter at its front end, forward of said coupling head, having a crank head, a finger-equipped bar intermediately connected to said coupling head, and a sickle bar cooperatively mounted on said finger bar and provided at its intermediate portion with a vertically extended cross-head subject to said crank-head.

28. In a machine of the kind described, a pair of closely spaced wheels, a frame including laterally spaced side frame portions adjacent to each of which a different of said wheels is located and to which it is journaled, said laterally spaced frame portions converging forwardly of the wheels and being connected by a coupling head, a tubular shaft casing located between the wheels with its front end rigidly connected to said coupling head, and its rear end portion supported from said frame portions, a main drive shaft journaled in and extending through said centrally located casing, an engine mounted on the rear end portion of the frame work and connected to the rear end of the main drive shaft, the latter, at its front end, forward of the coupling head, having a crank-head, a finger-equipped bar intermediately connected to said coupling head, and a sickle bar cooperatively mounted on the finger bar and provided at its intermediate portion with a vertically extended cross-head subject to said crank.

29. In a machine of the kind described, a frame, a pair of laterally spaced wheels journaled to said frame for independent rotary movements, rollers frictionally engageable with the peripheries of said wheels, and a motor on said frame having connections for simultaneously driving said rollers with a differential action due to slippage between said rollers and wheels.

30. In a mowing machine, cutting mechanism extending transversely of the line of travel of the machine, a power mechanism located rearwardly of and having a driving connection to said cutting mechanism, and means for dividing the cuttings in the line of travel of the machine including an upwardly extended divider mounted to vibrate transversely of the line of travel a materially greater distance at its upper end than at its lower end and having a connection to the said power mechanism for imparting such vibrations thereto.

31. In a mowing machine, a cutting mechanism extending transversely of the line of travel of the machine, power mechanism located rearwardly of and having driving connection with said cutting mechanism, said cutting mechanism comprising a toothed finger bar and a co-operating relatively vibratory sickle bar, and means for dividing the cuttings in the line of travel of the machine and including an upwardly extended divider rod located rearwardly of the cutting surfaces of the cutting mechanism and mounted to vibrate transversely of the line of travel of the machine a materially greater distance at its upper end than at its lower end and having a connection to the power mechanism for imparting such vibrations thereto.

32. The structure defined in claim 31 in which the said divider rod is mounted directly on the driving connection of the cutting mechanism to partake of common vibratory movements therewith independently of the sickle bar.

JACOB A. RONNING.